(12) United States Patent
Thibodeau (10) Patent No.: US 6,839,720 B1
(45) Date of Patent: *Jan. 4, 2005

(54) RENTAL PROPERTY CACHING AND SEARCHING SYSTEM AND PROCESS

(76) Inventor: Arthur Thibodeau, 126 Sea Hawk Dr. W., Kitty Hawk, NC (US) 27949

( * ) Notice: Subject to any disclaimer, the term of this patent is extended or adjusted under 35 U.S.C. 154(b) by 0 days.

This patent is subject to a terminal disclaimer.

(21) Appl. No.: 10/690,027

(22) Filed: Oct. 21, 2003

Related U.S. Application Data (62) Division of application No. 09/677,225, filed on Sep. 29, 2000, now Pat. No. 6,671,697.

(51) Int. Cl.[7] ............................................. G06F 17/00
(52) U.S. Cl. ................................................... 707/104.1
(58) Field of Search ................................ 707/100, 102, 707/104.1; 705/6, 400, 10; 709/1

(56) References Cited

U.S. PATENT DOCUMENTS

| | | | |
|---|---|---|---|
| 5,191,410 A | | 3/1993 | McCalley et al. ............. 358/86 |
| 5,235,680 A | | 8/1993 | Bijnagte ...................... 395/161 |
| 5,584,025 A | * | 12/1996 | Keithley et al. .......... 707/104.1 |
| 5,948,040 A | * | 9/1999 | DeLorme et al. ........... 701/201 |
| 6,275,808 B1 | * | 8/2001 | DeMarcken ..................... 705/6 |
| 6,321,202 B1 | * | 11/2001 | Raveis, Jr. ..................... 705/1 |
| 6,334,107 B1 | * | 12/2001 | Gale et al. ..................... 705/10 |
| 6,671,697 B1 | * | 12/2003 | Thibodeau ............... 707/104.1 |

* cited by examiner

*Primary Examiner*—Safet Metjahic
*Assistant Examiner*—Sana Al-Hashemi
(74) *Attorney, Agent, or Firm*—Andrew T. Prokopetz (57) ABSTRACT

A computer system and computer-implemented process for determining availability of rental property is disclosed. The computer implemented process includes inputting and storing data representing multiple sets of attributes for each of a plurality of rental property addresses and creating a plurality of records, one for each set of attributes for each of the plurality of rental property addresses. The process further comprises combining the plurality of records into one searchable master table, and periodically updating the plurality of records by inputting updated data for one or more of the multiple sets of attributes for the plurality of rental property addresses. To search for property availability, the user inputs one or more search parameters based on one or more desired attribute sets from the multiple sets of attributes to build a search query to search the master table for records of available rental property addresses. Matching rental properties are displayed. The process and software may also include providing a web-based hyperlink for each available rental property address that sends a user to a predetermined web address.

12 Claims, 5 Drawing Sheets

| PROPNO | PROPID | ATTR. 1 | ATTR. 2 | ATTR. 3 | ...STRT DAY |
|---|---|---|---|---|---|
| 100 | 415 Beechwood | 3 Bdrs | 2 Bths | OF | Sunday |
| 101 | 209 Mountain Vw | 4 Bdrs | 2 Bths | Pool | Sunday |

FIG. 4

| PROPNO | STRT DATE | END DATE | WK RATE | STAY LGTH |
|---|---|---|---|---|
| 100 | 01/01/00 | 12/31/00 | 400.00 | 5+ |
| 100 | 01/01/00 | 12/31/00 | 425.00 | 4 |
| 100 | 01/01/00 | 12/31/00 | 475.00 | 3 |
| 100 | 01/01/00 | 12/31/00 | 530.00 | 1-2 |
| 100 | 01/01/00 | 05/23/00 | -100.00 | 5+ |
| 100 | 01/01/00 | 05/23/00 | -110.00 | 4 |
| 100 | 01/01/00 | 05/23/00 | -125.00 | 3 |
| 100 | 01/01/00 | 05/23/00 | -140.00 | 1-2 |

FIG. 5

| PROPNO | LSE SRT | LSE END |
|---|---|---|
| 100 | 04/14/00 | 04/19/00 |
| 100 | 05/07/00 | 05/14/00 |
| 101 | 04/23/00 | 05/01/00 |

FIG. 6

| PROPNO | PROPID | STRT DATE | FREE DAYS | ATTR.1 | ATTR.2 | ... | DAY1 | DAY2 | DAY3 | DAY4 | DAY5 | DAY6 | ..... | DAYN |
|---|---|---|---|---|---|---|---|---|---|---|---|---|---|---|
| 100 | 415 Beechwood | 04/20/00 | 16 | 3 Bdrs | 2 Bths | | 390.00 | 780.00 | 1050.00 | 1260.00 | 1500.00 | 1800.00 | ... | 8400.00 |
| 100 | 415 Beechwood | 04/21/00 | 15 | 3 Bdrs | 2 Bths | | 390.00 | 780.00 | 1050.00 | 1260.00 | 1500.00 | 1800.00 | ... | 8400.00 |
| 100 | 415 Beechwood | 04/22/00 | 14 | 3 Bdrs | 2 Bths | | 390.00 | 780.00 | 1050.00 | 1260.00 | 1500.00 | 1800.00 | ... | 8400.00 |
| ... | | | | | | | | | | | | | | |
| 100 | 415 Beechwood | 05/15/00 | 21 | 3 Bdrs | 2 Bths | | 390.00 | 780.00 | 1050.00 | 1260.00 | 1500.00 | 1800.00 | ... | 10300.00 |
| 100 | 415 Beechwood | 05/16/00 | 20 | 3 Bdrs | 2 Bths | | 390.00 | 780.00 | 1050.00 | 1260.00 | 1500.00 | 1800.00 | ... | 10400.00 |
| ... | | | | | | | | | | | | | | |
| 100 | 415 Beechwood | 08/16/00 | 0 | 3 Bdrs | 2 Bths | | 390.00 | 780.00 | 1050.00 | 1260.00 | 1500.00 | 1800.00 | ... | 10400.00 |

RENTAL PROPERTY CACHING AND SEARCHING SYSTEM AND PROCESS

CROSS-REFERENCE TO RELATED APPLICATIONS

This application is a division of patent application Ser. No. 09/677,225, of the same title, filed Sep. 29, 2000 now U.S. Pat. No. 6,671,697.

BACKGROUND OF THE INVENTION

The present invention relates to data caching and search engine programs and more particularly to a system and method for caching rental real property information in a single, sorted and indexed table in a database according to a plurality of criteria to enable, through use of said single, indexed table in a database, rapid searching and retrieval of specific property.

The computer is a tool for manipulating, caching, searching, and retrieving data in many forms. Given a sufficiently large and accessible storage medium, a computer can sort and store volumes of information to be later searched according to selected criteria, essentially producing a customized report.

The computer has become a valuable tool in the real estate market, and especially in the fast paced area of vacation rental property. Several methods are known to match buyers with sellers of various types of property. On a basic level, an individual buyer might identify a piece of property that is being offered for sale through advertisement or word of mouth, and then directly contact the seller or the seller's agent. Once contact is made, negotiations can thereafter take place.

Particularly for large-scale transactions, the process usually is more complicated. Instead of searching item by item to find a desired piece of property, a buyer may wish to narrow the universe of potential property according to certain criteria such as price, size or location. This permits the buyer to avoid spending time looking at property or listings which are of only tangential interest or no interest at all, and instead to focus on the universe of property which most suits the buyer's needs. From the seller's perspective, it is desirable to narrow contacts with potential buyers to those more likely to result in a consummated transaction. Perhaps most importantly, it is in the seller's interest to evaluate the financial position of prospective buyers to minimize financial risk and to avoid added time and expense.

The vacation rental property market operates in a similar fashion. Families and individuals that desire specific vacation rental property generally have set criteria they seek in the property. For example, vacationers may want beach versus mountain sites, or skiing versus swimming features. As is evident, the combination of features that a particular individual may want from a particular piece of property can be very large and cumbersome to search.

Recently, advances in data storage and retrieval methods and communications methods have permitted more sophisticated approaches to performing searches that match buyers and sellers. Various forms of computer searches exist including Boolean based searches. In a typical computer based search, a search is performed based on pre-selected features.

In a typical Boolean search, a search system examines a search item for exact matches and absence of matches. For items with which quantitative comparisons are possible, the items are examined to determine whether the items are greater than or less than a given threshold of a search feature. A text-based search may examine the number of occurrences of a certain word in a text or character or characters in a text.

More specific examples of computer searches currently used include NEXUS.RTM., which utilizes a form of a tiered search. A user of the NEXUS.RTM. system initiates a search by selecting a set of search features. The NEXUS.RTM. system searches for items in a search pool, which are exact matches with the search features. Once this first level of search is concluded, the user has the option to narrow the search by selecting additional search features. A new search pool composed of the previously selected items is searched using the new set of search features. This process may be repeated until a predetermined number of items are selected.

Another example of a computer search includes the multiple listing system (MLS) typically used by real estate agents searching for client desired homes. A database is used which contains homes for sale listed by agents and placed in the MLS. The search method utilized in the MLS typically examines exact matches. For example, given a selection search feature of homes with a price range from $140,000 to $150,000, the MLS selects homes with prices within this range. However, the MLS does not select homes, which may be a little under or a little over the price range. Therefore, the search range is absolute. In addition, if a real estate agent is searching for a home located in a specific zip code, a search performed by the MLS discards any home in the search pool which is located outside of the specified zip code, including homes which are only one block away from the specific zip code.

Many real estate agents now utilize a network of terminals linked to a host computer that provides a database of listed properties. The agent can formulate a list of properties in which the buyer may be interested based on criteria provided by the buyer, such as price, location, size or type. The buyer can then view the property and, if interested, can contact the seller or more usually, the seller's agent in order to initiate negotiations.

Advances in communications and multimedia applications have been applied to improve the quality of the information conveyed to the potential buyer about property being offered for sale. For instance, U.S. Pat. No. 5,235,680 describes a system and method in which textual and image information is transmitted between a host and several remote display terminals. In this way, images of the property being offered can be conveyed in real time to the buyer.

A related prior art method of linking potential buyers with sellers involves "home shopping," typically using television and voice communication. For example, interactive systems have been proposed through which the prospective buyer can order merchandise advertised via data transmission over telephone lines, thereby eliminating the need to speak with a salesperson. The system described in U.S. Pat. No. 5,191,410 is illustrative of such a prior art approach.

Even more recently, the global network commonly referred to as the "Internet" has been used to advertise particular pieces of property to potential buyers. Such uses are primarily limited to situations in which a seller advertises a particular piece of property by posting a listing on an "electronic bulletin board" which may be read by potential buyers. The buyers can then contact the seller or the seller's agent by telephone or by electronic mail.

While greatly improving the accessibility of buyers to information concerning real property being offered for sale, these prior art methods and systems suffer from many disadvantages and drawbacks, particularly in the context of searching for short-term vacation rental property. Generally, home purchasing and long-term rental searches have a few key search criteria. This is generally due to the amount of information necessary for the search, where a potential buyer or renter is looking for more general property attributes, and relies on limited data storage in the computer system.

Most of the prior art approaches described above are limited in geographic scope. Thus, the time and expense incurred through use of the prior art approaches by a potential buyer interested in purchasing real property in a distant area is dramatically increased. Further, where networks are accessible to a larger geographic area, they typically require a subscriber fee to gain access, thereby resulting in added expense to the buyer, and thus providing a disincentive to at least those buyers not located close to the seller.

Moreover, many of the systems according to the prior art fail to perform more than an item-by-item listing of pieces of real property being offered for sale. A buyer must therefore expend a great deal of time and effort to sort through each item to find one that is of potential interest. This problem is further exasperated with short-term rentals where the potential renter is looking for a very specific set of property attributes. Even where the prior art provides a sorting function, such as with the real estate databases, they generally are not directly available to the buyer, but instead must be accessed through an agent. Again, this adds to the buyer's costs, and provides a disincentive to purchase, thus adversely impacting the seller.

Therefore, it would be desirable to have a rapidly searchable database for a large number of rental property listings that is searchable through several different property attributes, and which is regularly updated with current rental information, and that overcomes the above-noted problems with current property databases. These and other objects of the present invention will become apparent through the disclosure of the invention to follow.

SUMMARY OF THE INVENTION

The invention provides a computer-implemented system and method that periodically, e.g., each night updates a master table created from data set into a plurality of data files. The master table contains primary and secondary data bits so that a search is conducted on the primary data bits and the search results display the primary and secondary data bits. The master table includes a line listing for each of a plurality of items with a number of starting dates for a rental period, beginning after any pre-existing commitment for the item. The master table displays a calculated number of free days according to the time from the calculated starting dates to the next pre-existing commitment for the item. The data displayed for each item and starting date includes a calculated total cost for each rental period from the starting date to the maximum number of free days.

The present invention also contemplates a method for creating and searching a summary rental property table based on selected rental property search features. The method includes inputting and storing data representing multiple sets of attributes for each of a plurality of rental property addresses, creating a record for each set of attributes for each of the plurality of rental property addresses, and identifying respective data in the multiple sets of attributes similarly for each of the plurality of rental property addresses. The method further comprises creating a single searchable master table by combining the multiple sets of attributes, and periodically inputting updated data for one or more of the multiple sets of attributes for the plurality of rental property addresses. The invention further contemplates inputting a search query using data from one or more of the multiple sets of attributes to search the plurality of rental property addresses, comparing each record in the master table with the inputted search query, disregarding records in the master table which do not match said search query, and displaying all records that match said search query.

The attributes for each property may include the number of bedrooms, bathrooms, fireplaces, hot tubs, rental rates for a particular period of time, and availability. Other potential attributes could include proximity to local features of interest, such as beaches, mountains, restaurants, museums, etc.

In sum, the rental real property search system of the invention may be utilized for a search through a large group of items in a single, indexed master table, with a significant number of search features being selected. In addition, the search system is especially useful where a user is seeking for a relatively short term real property rental a specific set of attributes, including current pricing and current availability information since this information is updated on a real time basis.

BRIEF DESCRIPTION OF THE DRAWINGS

In order for the invention to become more clearly understood it will be disclosed in greater detail with reference to the accompanying drawings, in which.

DETAILED DESCRIPTION

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

The present invention is directed to a fast search engine for the vacation rental home market that can be part of an Internet based real time reservation system that is sold. Other potential applications could include a Windows (or other O/S) Property Management back office application.

A computer system for implementing the present invention generally may take many forms, from a configuration including a variety of processing units, as further described herein, networked together to function as a integral entity, to a single computer, e.g., a personal computer, operational in a stand-alone environment. The present invention can be embodied in any of these computer system configurations.

Figure 1A:
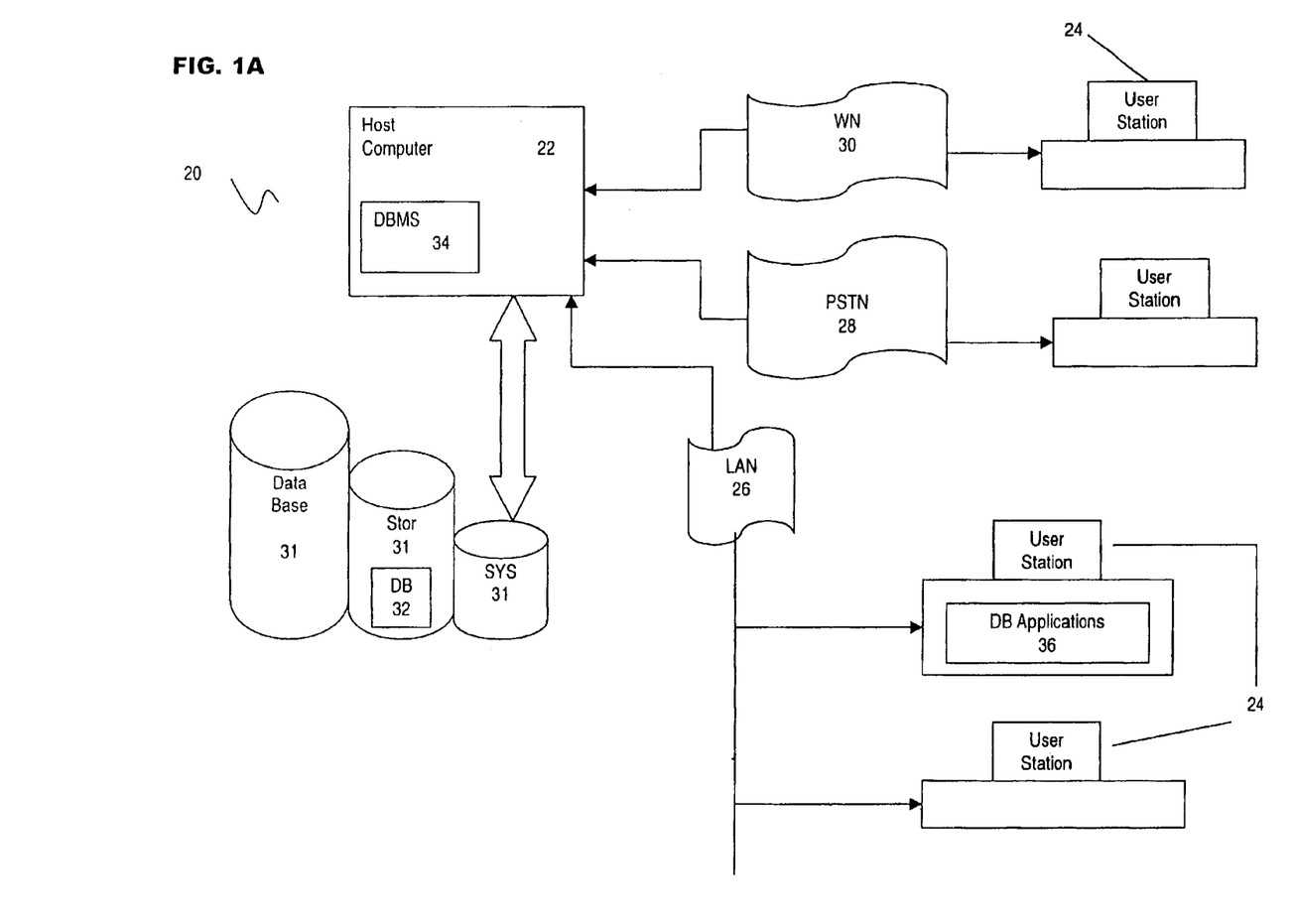
FIGS. 1A and 1B are block diagrams of a general computer architecture useful for implementing the present invention.

Referring to FIG. 1A, in a presently preferred embodiment, a computer system 20 includes a host computer 22 connected to a plurality of individual user stations 24. In a presently preferred embodiment, the user stations 24 each comprise suitable data terminals, such as, e.g., personal computers, portable laptop computers, or personal data assistants ("PDAs"), which can store and independently run one or more applications (i.e., programs). For purposes of illustration, some of the user stations 24 are connected to the host computer 22 via a local area network ("LAN") 26. Other user stations 24 are remotely connected to the host computer 22 via a public telephone switched network ("PSTN") and/or a wireless network 30.

In a presently preferred embodiment, the host computer 22 operates in conjunction with a data storage system 31, wherein the storage system 31 contains a database 32 that is readily accessible by the host computer 22. In a presently preferred embodiment, the database 32 is a relational database.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

The host computer 22 includes a database management system ("DBMS") 34, which is one or more programs and/or hardware circuitry, configured to access data stored in the database 32. In a presently preferred embodiment, each of the user stations 24 includes its own database applications layer 36, which is one or more programs and/or hardware circuitry configured to interact with the DBMS 34.

The respective database applications layer 36 of a user station 24 allows a user of the computer system 20 to access data from the database 32 by forming and submitting queries on the user station 24. In particular, in a presently preferred embodiment, a user-submitted query is converted into an SQL statement by a database applications layer 36, resident in the host computer or in respective user station 24. SQL is a standard language used in relational database management systems. An SQL query is the respective user query formatted in SQL. The SQL query is issued to the DBMS 34, which executes the SQL query and returns a responsive data result set to the user.

Although SQL is a presently preferred language, other languages may alternatively be used for executable queries. In other alternative embodiments, a user query may be submitted to a respective database applications layer 36 in an appropriate language format for execution by the DBMS 34.

Figure 1B:
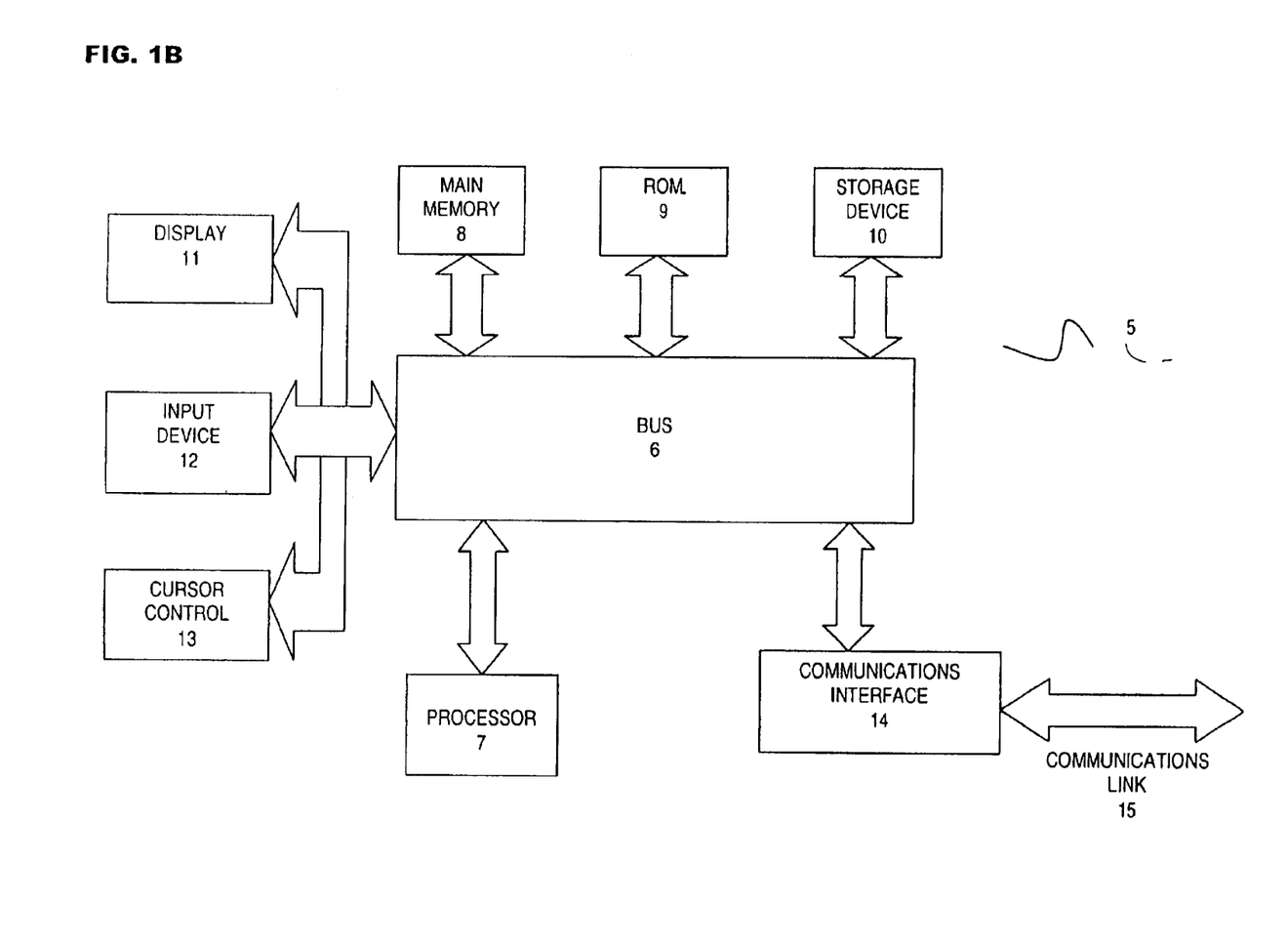

Referring to FIG. 1B, in a presently preferred embodiment, each user station 24 and the host computer 22 (each referred to generally as a processing unit) embodies a general architecture 5. A processing unit includes a bus 6 or other communication mechanism for communicating instructions, messages and data (collectively, information), and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data (i.e., variables) or other intermediate information during execution of instructions by the processor(s) 7.

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display 11, such as a cathode ray tube (CRT), for displaying information to a user. An input device 12, including alphanumeric and other keys, is coupled to the bus 6 for communicating information and command selections to the processor(s) 7. Another type of user input device may include a cursor control 13, such as a mouse, a trackball, a fingerpad, or cursor direction keys for communicating direction information and command selections to the processor(s) 7 and for controlling cursor movement on the display 11.

According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein. In alternative embodiments, hardwired circuitry may be used in place of or in combination with software instructions to implement the invention. Thus, embodiments of the invention are not limited to any specific combination of hardware circuitry and/or software.

The term "computer-readable medium," as used herein, refers to any medium that provides information to the processor(s) 7. Such a medium may take many forms, including, but not limited to, non-volatile, volatile and transmission media. Non-volatile media, i.e., media that can retain information in the absence of power, includes the ROM 9. Volatile media, i.e., media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program, i.e., application, code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

For tables in a database with a large number of records, a responsive data result set generation process for a user query may be quite resource and time intensive. To improve runtime performance, responsive data result set values are often pre-generated and stored in summary tables that contain summarized data from one or more other tables. An SQL query that accesses a summary table will generally process more quickly than a corresponding SQL query that accesses the original data table(s).

A description of the processes contemplated by the present invention will now be described with reference to FIGS. 2–6.

Figure 2:
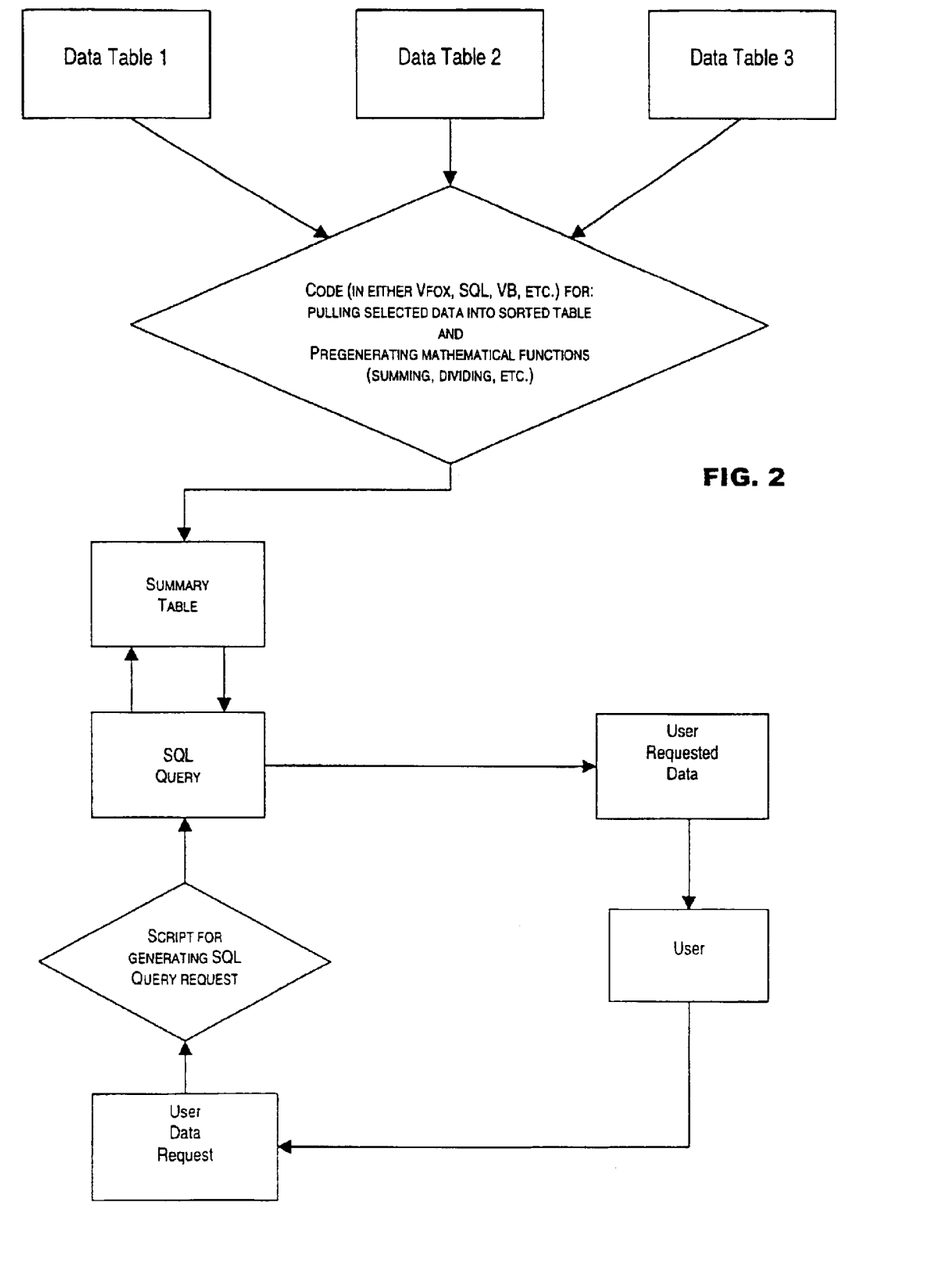
FIG. 2 is a flow chart illustrating a data-caching scheme according to the present invention.
Figure 3:
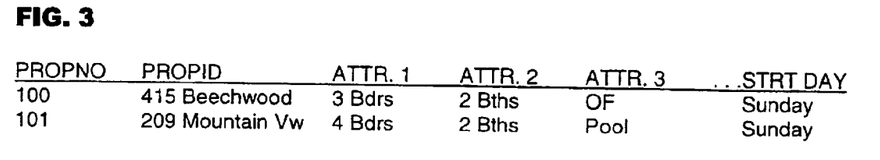
FIG. 3 is a sample file in which a series of property attributes that pertain to each of the properties are listed.
Figure 4:
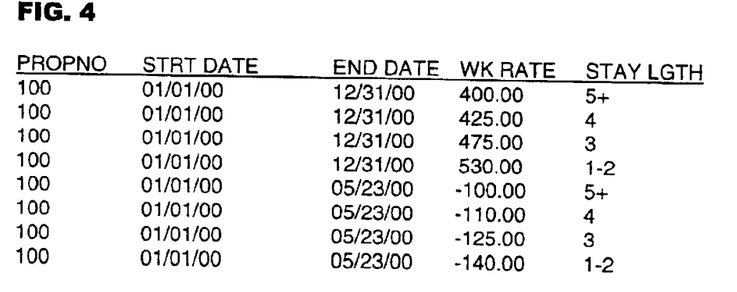
FIG. 4 is a sample file in which a series of rental rates that pertain to each of the properties are listed
Figure 5:
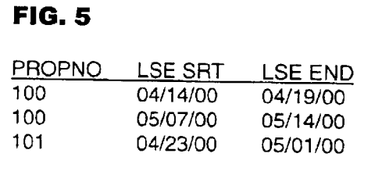
FIG. 5 is a sample file in which a series of unavailable dates that pertain to each of the properties are listed.

FIG. 2 is a block diagram illustrating the basic premise of the present invention. As illustrated in FIG. 2, data representing multiple sets of attributes from various property locations are stored in Data Tables 1, 2, and 3. This data preferably represents rental rates, property attributes, and property availability for a plurality of rental property locations. Preferably once a day, in the evening, various property management companies (companies that rent vacation homes for private owners) uploads three delimited ASCII files to a main server:

1. A property master file that lists each property the company manages along with details about that property such as number of bedrooms, number of bathrooms, amenities (like a hot tub), and the day that rentals usually start if there is a start day (Friday, Saturday, Sunday.) Additional details are added as necessary, depending on the type of homes that the company manages. If a company manages 200 properties there will be 200 delimited records in the file.

2. A rates file that details the rental rates for each property. These files usually cover the full year and break out the daily, weekly or monthly rates for the property, depending on the season.

3. A leases or reservation file that details all of the properties and the dates that they are already rented and thus not available.

After the files are received a program (which can be written in Visual Foxpro, but easily ported to C++) performs the following operations:

1. First, the three ASCII files are imported into three empty Foxpro database tables that are equivalent to the three delimited files, that is, a property master table ("propmast.dbf", see FIG. 3 for the table structure and sample data), a property rate table ("rates.dbf", see FIG. 4 for the table structure and sample data) and a leases table ("leases.dbf", see FIG. 5 for the table structure and sample data). Several operations are performed on these tables to prepare them for use on the Internet.

2. The next series of steps builds a single denormalized database table (a table with data redundant to the three tables mentioned above) that will ultimately be used for Internet based or back office based property searches.

Figure 6:
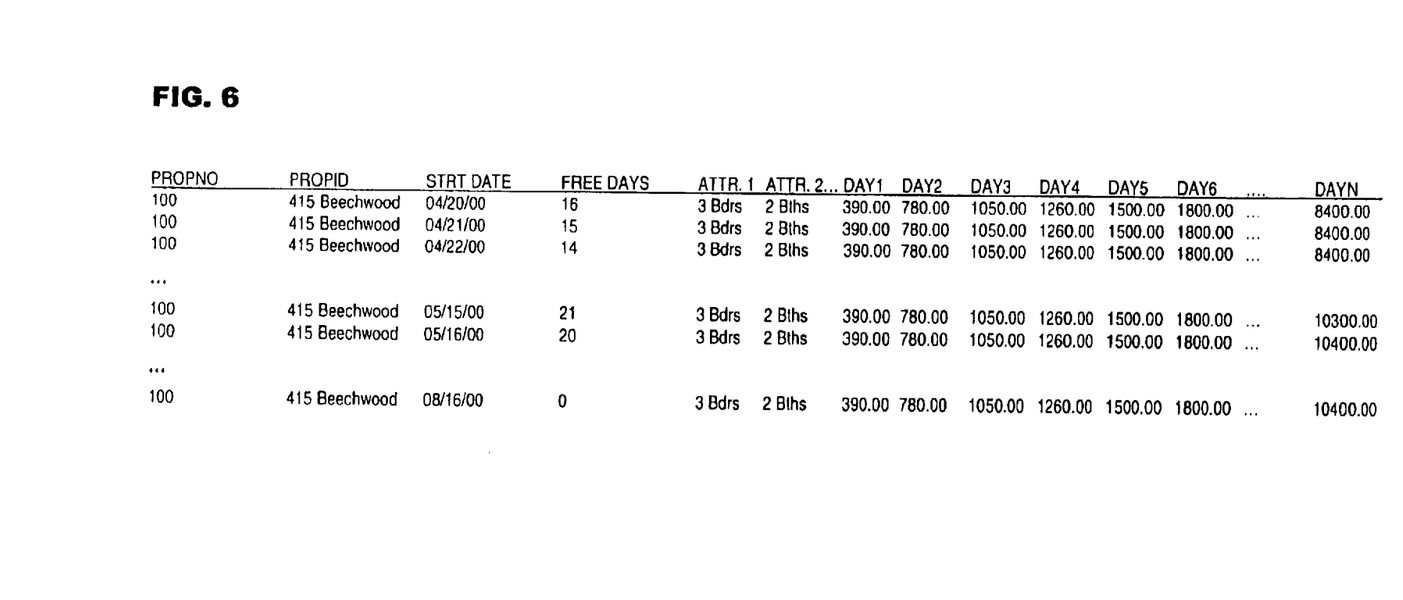
FIG. 6 is a sample table in which some of the data of the files of FIGS. 3–5 are shown.

As illustrated in FIG. 6, the structure of the "searchdb.dbf" table provides a very fast and flexible set of search routines. It allows the user to specify any arrival date (or even a range of arrival dates), any number of nights to stay, amenities desired (bedrooms, baths, hot tub, pool, pet home, etc.), and maximum rent that the user is willing to pay for the total stay. In just a few seconds on a typical Internet connection a result set (using our 200 home example) is presented to the user that meets his or her criteria, including the total cost of the stay. The structure of the "searchdb.dbf" table is as follows:

1. For each property that the company manages there are N number of records where N represents the difference when the end period date (usually the last day of the current calendar year, but theoretically any date after the present day) is subtracted from the current date. For example, if the current date is May 18, 2000 and the specified end date is Dec. 31, 2000, the number of records per property would be 227. In other words there are 227 days remaining from May 18 to December 31. Using these dates, the total size of this table for a company that manages 200 homes would be 45,400 records (200 homes×227 records).

2. Each record contains the following fields (sample field names are in parentheses):

a. A property identifier field ("propid"), which uniquely identifies a particular property.

b. Fields containing the name of the property ("propname"), number of bedrooms ("bedrooms"), number of baths (baths), the normal start day if the property rents on a weekly basis ("Strtday"—Saturday, Sunday, etc.), and amenities like hot tubs, pools, ocean or lakeside, etc. In our sample table these amenity fields are labeled "ATRR.1," "ATTR.2," "ATTR. 3", etc. Any number of amenities can be processed.

c. An arrival date field ("strtdate") that represents the date the guest wants to arrive. In the example using May 18 above, the first of 204 property records would have the date May 18, 2000, the next record May 19, 2000 and so on until the date Dec. 31, 2000 occurred.

d. An availability field ("free days") that contains a number that represents how many nights are available from the arrival date in the field "strtdate" to the next booked or reserved date for this property. The maximum number that can exist in this field is set by the property Management Company and represents the longest stay that can be booked on the Internet or by the property management system. For many companies this number is 28 (4 weeks) or less, but theoretically it can be any number. So the number in this field will usually vary from 0 to 28. A value of 0 or less indicates that the property is rented and thus not available for any number of evenings. A value of 7 indicates that the user can make a rental for up to 7 days, beginning on the date in "strtdate".

e. N additional fields named "day1", "day2" . . . "dayN" where N is the maximum number of days that the user can rent the property as specified by the property management company. The maximum value of N is the maximum number of nights that a guest is allowed to reserve a property. Each one of these fields represents the cost for a stay in the home from the arrival date as specified by "strtdate" through the departure date as specified by "strtdate"+N. For example, the rate for a six day stay beginning on the date in "strtdate" would be stored in "day6", a seven day stay in "day7" and so on.

The "searchdb" table is constructed as follows:

1. The program loops through the property master ("propmast.dbf") table from top to bottom. For each property that it finds the program adds to "searchdb.dbf" the number of records determined as set forth above. Starting with the present date and proceeding to the end date the program builds a record for each day as follows:

a. The "propid", "propname", "strtdate", "bedroom", "bathroom", and amenities ("ATTR. 1"—"ATTR. N") fields are directly filled from the "propmast" record. The field names are equivalent in both tables ("propmast.dbf" and "searchdb.dbf").

b. The "strtdate" field is calculated as present date+N where N is the number of records built thus far. For example, if we were starting the first record at May 18, 2000, the first property record built would have the value May 18, 2000 in "strtdate", the second May 19, 2000, the fifth May 23, 2000 and so on.

c. The "freedays" field is calculated as follows: Using the value in "strtdate" as the arrival date and "strtdate"+N, where N is the maximum number of days that the company allows for reservations, as the end date, the program checks the lease file to determine if another lease or reservation conflicts with these dates. If no lease conflicts, the value of N is inserted into the "freedays" field. If there is a conflict, N is reduced by one and "strtdate"+(N−1), the new departure date, along with the value in "strtdate", is tested against the leases table. The process continues, that is, N is reduced by 1 until there is no conflict with another lease or until N reaches zero (0), whichever comes first. "Freedays" now contains the maximum number of days that are clear from "strtdate" on. For example, if "freedays" contains the value 9, a reservation for up to 9 days can be made beginning on the date in "strtdate." If the value of "freedays" is zero, no reservations can be made that begin on this date. The process of filling this field can be done sequentially or through a binary search for the first no-conflict occurrence.

d. "Day 1", "day2" . . . "dayN" fields are calculated as follows: Using the date stored in "strtdate" as the arrival date and "strtdate"+N, where N is the value of N in "dayN", as the departure date, the system uses the rate file to determine the rent for the period. A simple property rate of $100 per day would yield $100 in "day1", $200 in "day2", $300 in "day3" and so on. (Rates are usually much more complicated than this as there may be many different daily, weekly or monthly rates for each property.)

The completed "searchdb.dbf" table can then be queried as follows:

1. In a date specific mode the user first specifies the following:

a. The exact date that he or she wants to arrive.
   b. The number of nights or days that he or she wants to stay.
   c. The maximum amount of rent that the user is willing to spend.
   d. The number of bedrooms and baths needed.
   e. The amenities needed such as (but not limited to) hot tub, swimming pool, phone, air conditioning, etc.

The data from the user is then used to build a query against the search table. The arrival date is queried against the "strtdate" field for an exact match. The number of nights that the user wishes to stay is queried against the "freedays" field —the value in this field must be equal to or greater than the number of nights that the user wishes to stay for the record to be included in the results set. While most of the additional parameters used in the query are taken directly from the user's input, the portion of the query regarding the maximum rent is built using the number of days that the user intends to stay. Specifically, the field name in the "searchdb.dbf" table to check for maximum rate is determined by adding the string "day" with the character value of the number of nights the user wants to stay. For example, if the user is planning to stay for 8 nights, the field queried for maximum rent is "day8", derived programmatically as "day"+"8" yielding the string "day8." This string is inserted into the SQL statement as the field queried for maximum rent. The value in this field must be equal to or less than the maximum amount of rent that the user is willing to pay for the record to be included in the result set.

In a date range mode the user specifies the following:

a. The range of dates (a start and stop date) between which he or she wants to arrive.
   b. The number of nights or days that he or she wants to stay.
   c. The maximum amount of rent that the user is willing to spend.
   d. The number of bedrooms and baths needed.
   e. The amenities needed such as (but not limited to) hot tub, swimming pool, phone, air conditioning, etc.

The data from the user is then used to build a query against the search table. The arrival date is queried against the "strtdate" field for any record that falls between the start and stop dates specified by the user in the range of arrival dates. While most of the additional parameters used in the query are taken directly from the user's input, the portion of the query regarding the maximum rent is built using the number of days that the user intends to stay. Specifically, the field name in the search table to check for maximum rate is determined by adding the string "day" with the character value of the number of nights the user wants to stay. For example, if the user is planning to stay for 8 nights, the field queried for maximum rent is "day8", derived programmatically as "day"+"8" yielding the string "day8." This string is inserted into the SQL statement as the field queried for maximum rent.

The output table that is a result of querying "searchdb.dbf" represents the homes that are available for the user specified time frame. It is used to build a table that is presented to the user on a Web page or application screen. Each line in the table lists a property that is available on the date specified for the number of nights specified, along with the property name, number of bedrooms, number of baths, amenities and the rate for the rental period. A property hyperlink that will bring the user directly to the property is programmatically created for each record and is part of the presentation to the user. The user can click on this property hyperlink to see detailed information about the property, including, but not limited to, photos, floor plans, inventory, description, additional availability, etc.

Once the user clicks on one of the property hyperlinks that is created for each record in the table as detailed above, a detailed description of the property is sent to the browser or applications terminal. This page can contain images and text that provides the user with more information about the property. A reservation hyperlink is created for the time period queried. The user can click on this hyperlink to make a reservation for that time period. The program that sends this page to the user also creates and runs an SQL statement that queries "searchdb.dbf" for all of, or a range of, dates that are available for the property that the user is interested in. This data is presented to the user as well. Because of the flexibility of "searchdb.dbf" as it relates to availability (that is, because the field searchdb.freedays contains, for every day in the year for every property, how many days are free from that date on) the program can create additional reservation hyperlinks that allow the user to reserve the property by clicking on a reservation hyperlink.

For example, if a user queries the system for all homes with private pool, hot tub, 4 bedrooms, 3 baths, available for three nights arriving June 10, the system returns a table, complete with property hyperlinks, that lists all properties that fit the criteria. When the user clicks on one of these property hyperlinks a detailed description of the property is presented along with a table of reservation hyperlinks that represent all of the three night periods that are available within a month (this is an arbitrary period, it could be two or three months) of the arrival date specified in the user's query. This is done by creating an SQL statement that queries "searchdb.dbf" for records that have a value in searchdb.freedays equal to or greater than the value specified by the user for the number of nights required and a value in searchdb.propid equal to the property number that the user is interested in.

The table "searchdb.dbf" is updated (not rebuilt) each time a reservation or cancellation is made by a reservationist at a real estate company or a reservation is made by a user on the Internet. In a real time environment "searchdb.dbf" is updated every time that a user makes a reservation on the Web or a user makes a reservation or cancellation on the back office property management system (the real estate office system sends the reservation or cancellation information to Web servers via the Internet.)

In one preferred process, three "Vacation Wizards" ("Wizard" and "Wizards" being terms adopted for reference) may be set up to search a single, sorted and indexed table in a database of vacation homes. The search results would be linked to actual properties. For example, the following three Wizards perform the following searches from the same table ("searchdb.dbf"):

1. Wizard 1 uses the vacationer's exact arrival date, number of nights the vacationer will be staying, the number of bedrooms needed and the maximum price that the vacationer can pay for the entire stay. It returns a list with all homes that meet the criteria.
2. Wizard 2 uses a range of arrival dates, number of nights the vacationer will be staying, the number of bedrooms needed and the maximum price that the vacationer can pay for the entire stay. It returns a list with all homes that are available within the range of arrival dates. Even though a property may be available for several different periods within the range, it is only listed once.
3. Wizard 3 also uses a range of arrival dates, number of nights the vacationer will be staying, the number of bedrooms needed and the maximum price that the vacationer can pay for the entire stay. It returns a list with all homes that are available within the range of arrival dates. If a property is available for several different periods within the range, each period for that property is listed. For example, if the vacationer can arrive between August 1 and August 30 for a 3 day stay, the same property may be available on August 1, August 2, or August 15. This Wizard lists all three. Therefore this search usually returns a larger result set.

Other Wizards could also be easily implemented that represent additional amenities that can be queried against by the user.

I claim:

1. Apparatus utilizing a data processor for determining which of a number of rental properties are both available and suited to the needs of a typically short-term renter of real property comprising:
   a. a rental property database for storing a plurality of variable attributes related to a typically large number of rental properties typically rented for a short term to enable rapid searching and retrieval of available properties having certain desired attributes;
   b. a single master search database table indexed in correspondence with the nature of said attributes and having a plurality of periodically updated fields in which all of the information associated with and necessary for selecting said attributes is stored with use of said data processor, and from which it can be retrieved;
   c. means for inputting to said table a search query of certain variable attributes to search a plurality of rental properties;
   d. means for comparing the attributes of each said property in said table with the inputted search query, and
   e. means for displaying all properties in said table that match said search query.

2. An apparatus, as claimed in claim 1, including means for supplying said information by a plurality of files comprised of said variable attributes.

3. An apparatus, as claimed in claim 1, wherein said fields are comprised of:
   a) a property identification field;
   b) a startday field representing the day of the year that represents the arrival date;
   c) a freedays field that represents how many consecutive days that can be rented are available from the date in the startday field;
   d) a modulus field representing multiples of the number of days rented allowed;
   e) a mindays field that represents the minimum number of days that a rental property can be rented; and
   f) a plurality of multiple day(n) fields where n represents the number of days that are to be rented.

4. An apparatus, as claimed in claim 1, wherein said single master search database table is arranged such that it can be searched by various search fields, said search fields comprising:
   a) type of activity;
   b) destination by state;
   c) start date; and
   d) length of stay.

5. An apparatus, as claimed in claim 1, including means enabling the search results to be narrowed according to location.

6. An apparatus, as claimed in claim 1, including means enabling the search results to be narrowed according to number of bedrooms.

7. An apparatus, as claimed in claim 1, including means enabling the search results to be narrowed according to price.

8. An apparatus, as claimed in claim 1, including means responsive to a query directed to said single indexed master search table for extracting from said single indexed master search table the identity of a selected number of properties, which are both available and suited to said needs, onto a results screen.

9. An apparatus, as claimed in claim 8, wherein said results screen includes a hyperlink to each of said properties that will direct a user to a record for said properties, which match said needs.

10. A method comprising the steps of
   a. compiling a single indexed master search database table having fields including:
      i) a property id field that identifies the property;
      ii) a start day field that represents the arrival date;
      iii) a freedays field that represents how many consecutive days that can be rented are available from the arrival date forward and setting the freedays field to zero if the property cannot be rented on the arrival date;
      iv) a modulus field that represents the multiples of days that the property can be rented;
      v) a mindays field that represents the minimum number of days that the property can be rented;
      vi) an unlimited number of day(n) fields where n represents the number of days that are to be rented; and
      vii) a total rent value that represents the rent to be paid calculated by the n in each day(n) field; and
   b. extracting from said single indexed master search database table the identity of a selected number of properties.

11. The method of creating said single indexed master search database table as described in claim 10, wherein said table can be searched by various search fields, said search fields comprising:
   a) type of activity;
   b) destination by state;
   c) start date;
   d) price; and
   e) length of stay.

12. A method of claim 10, wherein step (a) includes predetermining for each of the said real properties the presence or absence of selected amenities comprising, the number of bedrooms, hot tub, swimming pool, telephone, and air conditioning, step (b) includes fields representative of all the information obtained in step (a) related to said selected amenities and step (b) includes extracting from said single indexed master search database table, the identity of all properties which suit said availability and suitability needs including said selected amenities.

* * * * *